US005247612A

United States Patent [19]

Quinard

[11] Patent Number: 5,247,612

[45] Date of Patent: Sep. 21, 1993

[54] PIXEL DISPLAY APPARATUS AND METHOD USING A FIRST-IN, FIRST-OUT BUFFER

[75] Inventor: Fabrice M. Quinard, San Jose, Calif.

[73] Assignee: Radius Inc., San Jose, Calif.

[21] Appl. No.: 546,711

[22] Filed: Jun. 29, 1990

[51] Int. Cl.$^5$ .............................................. G06F 15/62

[52] U.S. Cl. ..................................... 395/166; 395/164

[58] Field of Search ................................ 364/518-522; 395/164-166

[56] References Cited

U.S. PATENT DOCUMENTS 3,787,819 1/1974 Busink ............................ 395/164 X 5,020,003 5/1991 Moshenberg ...................... 395/164

5,088,053 2/1992 Sprague et al. .................... 395/166

OTHER PUBLICATIONS

Markoff, John, "Personal Computers May Soon Add TV's Beauty," New York Times, pp. C1 and C5, Sep. 12, 1989.

Guglielmo, Connie and Battle, John, "RasterOps Cut Multimedia Costs," MacWeek, pp. 1 and 9, Feb. 6, 1990.

"DVA-4000/ISA" data sheet, Video Logic 1989.

Visual Communications, Inc., "D.FACTO".

*Primary Examiner*—Gary V. Harkcom

*Assistant Examiner*—Almis Jankus

*Attorney, Agent, or Firm*—Stuart P. Meyer

4 Claims, 2 Drawing Sheets

PIXEL DISPLAY APPARATUS AND METHOD USING A FIRST-IN, FIRST-OUT BUFFER

RELATED APPLICATIONS

The subject matter of this application relates to the subject matter set forth in pending U.S. patent applications Ser. No. 07/547,060, entitled "Graphic Animation System and Method," filed on Jun. 29, 1990 by Pierre-Alain Cotte, et al.; Ser. No. 07/546,916, entitled "Methods and Means for Manipulating Pixel Data," filed on Jun. 29, 1990 by Pierre-Alain Cotte, et al.; Ser. No. 07/546,712, entitled "Memory Structure and Method for Managing Pixel Data," filed on Jun. 29, 1990 by Pierre-Alain Cotte et al.; Ser. No. 07/546,915, entitled "Method and Apparatus for Binary Value Modification by a Percentage," filed on Jun. 29, 1990 by Thierry Mantopoulos; Ser. No. 07/547,023 entitled "Phase Locked Loop," filed on Jun. 29, 1990 by Thierry Mantopoulos and Fabrice Quinard; Ser. No. 07/547,026, entitled "Video Synchronization Generator and Method," filed on Jun. 29, 1990 by Fabrice Quinard; and Ser. No. 07/547,024, entitled "Bus Structure and Method for Compiling Pixel Data with Priorities," filed on Jun. 29, 1990 by Thierry Mantopoulos and Fabrice Quinard, incorporated herein by reference.

BACKGROUND AND FIELD OF THE INVENTION

This invention relates to video displays and more particularly to a video buffer system and method for selectively altering the pixels in memory that are displayed.

Traditionally, pixel data stored in a memory such as a Video Random Access Memory (VRAM) is scanned out of memory on a line-by-line basis for display on a raster-type display screen on a corresponding line-by-line basis.

SUMMARY OF THE INVENTION

In accordance with the present invention, each line of pixel data that is accessed from a VRAM is selectively stored in a First-In, First-Out (FIFO) buffer memory under selective write controls. In addition, the pixel data stored in the FIFO Buffer may be selectively read out for display under selective control in order to alter the display of the stored data.

DESCRIPTION OF THE PREFERRED EMBODIMENT

Figure 1:
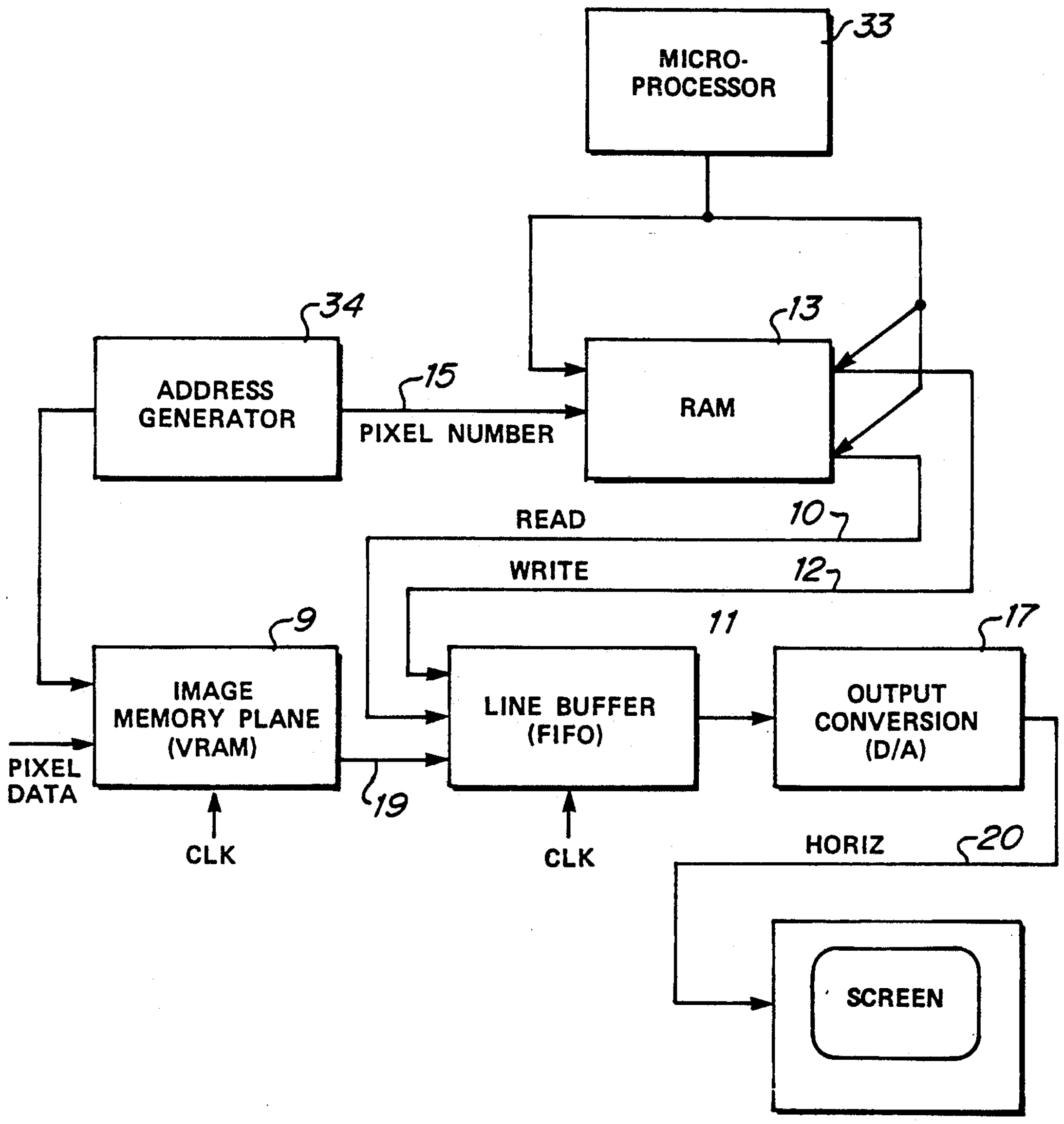
FIG. 1 is a system block diagram of the preferred embodiment of the present invention.
Figure 2:
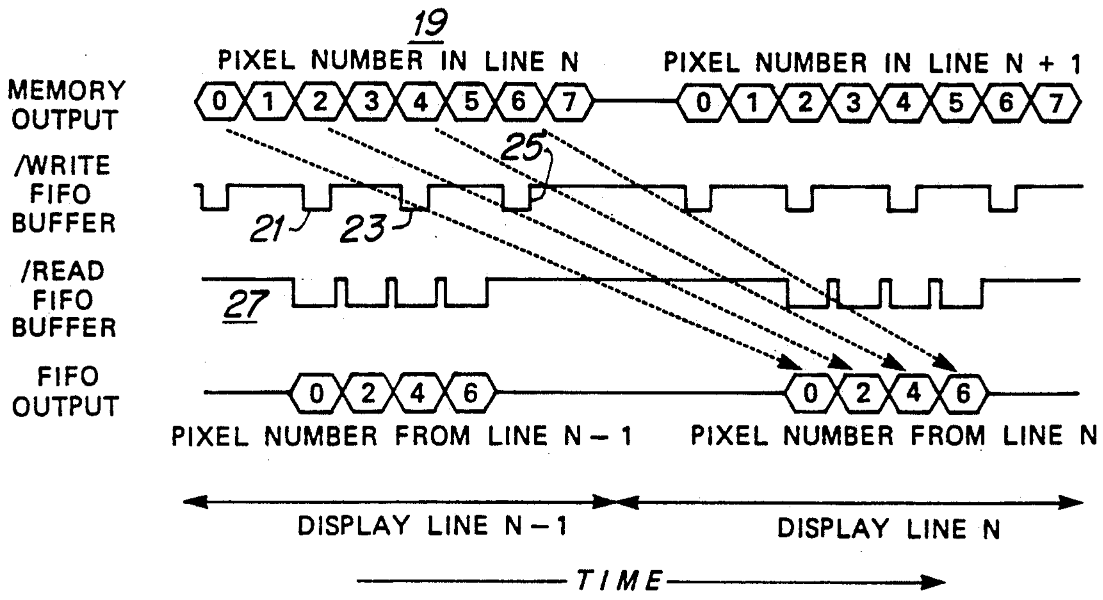
FIG. 2 is a timing diagram illustrating video data compression through the FIFO, in accordance with the present invention.

Referring now to FIG. 1, there is shown a block schematic diagram of one embodiment of the present invention in which a standard VRAM 9 is coupled to a standard FIFO buffer 11 for accessing lines of pixel data from the VRAM 9 to store in the FIFO buffer 11. Devices of this type are commercially available as devices which operate in response to clock input signals (not shown). In addition, the FIFO buffer 11 also responds to read and write signals 10, 12 applied thereto from Random Access Memory (RAM) 13 that also receives an input signal 15 indicative of the pixel number being accessed either from the VRAM 9 for selective writing into the FIFO buffer, or from the FIFO buffer 11 for selective reading to the output converter circuit 17. The FIFO buffer 11 may be as wide as a line of bytes of displayable pixel data (typically, 640 to 768 bytes), and one line deep. Thus, as successive lines of pixel data (each pixel containing, for example, 8 bits of color information) are accessed from successive addressed locations in the VRAM 9, a write signal 12 may be applied to the FIFO buffer 11 under control from RAM 13 to enable (or not enable) the particular pixel data to be written into the FIFO 11. As illustrated in the graph of FIG. 2, the alternate numbered blocks of pixel data 19 may be selected for storage in FIFO 11 in response to write signals 21, 23, 25, thereby resulting in horizontal compression of the image to be displayed. Of course, other ones of successive blocks of pixel data accessed from the VRAM 9 may also be selected, including aperiodic block selections, each third block, a burst of successive blocks, and the like. The intermediate storage operation of FIFO buffer 11 delays the display of the selected pixel data until the time interval of the next display line, as illustrated in FIG. 2. In the graph, a read signal is illustrated as occurring at each interval corresponding to a block of pixel data in the FIFO buffer 11. In this operating mode, each block of pixel data from the VRAM 9 that was selected to be written into the FIFO buffer 11 is thus read out 27 of the buffer 11 into the output converter 17 which may, for example, include a Digital-to-Analog (D/A) converter for producing the display-driving signal 20 in conventional manner.

Figure 3:
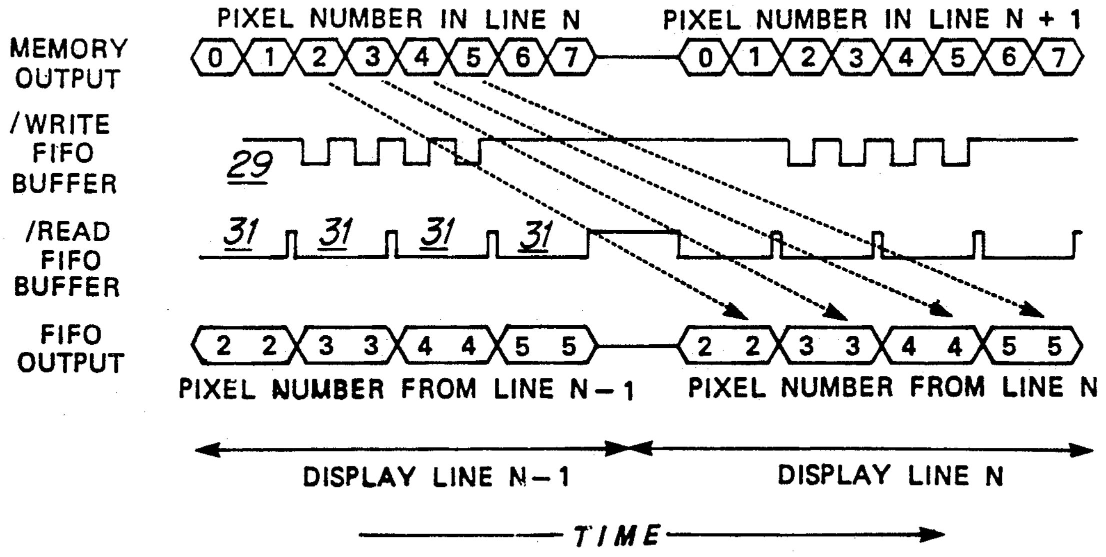
FIG. 3 is a timing diagram illustrating video data expansion through the FIFO, in accordance with the present invention.

With reference to the graph of FIG. 3, there is shown an alternate operating mode in which each successive block of pixel data that is accessed from the VRAM 9 is written 29 into the FIFO buffer 11. In addition, and independently of the write mode, the read mode may be operated at a slower rate to duplicate selected blocks of pixel date and thereby create an expanded image on the display. As shown, each block of pixel data may be read out twice 31 from the FIFO buffer to create a 'zoom' effect on the displayed image by a factor of two. Similarly, each block of pixel data may be read out three or four or M times to produce corresponding zoom effects by factors of three, four, and M, respectively. Of course, an active line of pixel data stored in the VRAM may also be accessed repeatedly a corresponding number of times to create uniform 'zoom' effect both horizontally (by repeated pixels) and vertically (by repeated lines). The read and write control signals 10, 12 for selecting which blocks of accessed pixel data are stored in the FIFO buffer 11, and the number of times each stored block is read out from the FIFO buffer 11 is controlled by data stored in RAM 13 which may be updated by a microprocessor 33 and controlled by an address generator 34 that also supplies addresses 35 to the VRAM 9 to control which lines of pixel data are accessed.

Therefore, the system and method of the present invention selectively alters pixel data per line of raster-type display, and selectively modifies the displayable data to create zoom effects under control of intermediate buffer memory.

What is claimed is:

1. Apparatus for displaying pixel data sequentially stored at addressable locations in memory, the apparatus comprising:
 a first-in, first-out (FIFO) buffer including input and output ports and read and write control signal ports, the FIFO buffer sequentially storing pixel data applied to the input port responsive to write control signals applied to the write control signal port, the FIFO buffer supplying at the output port the pixel data sequentially stored at addressable locations in memory responsive to read control signals applied to the read control signal port;
 means coupled to the input port of the FIFO buffer for supplying pixel data to the FIFO buffer;
 first control means for supplying write control signals to the FIFO buffer for storing in the FIFO buffer the selected pixel data supplied to the input port of the FIFO buffer;
 second control means for supplying read control signals to the FIFO buffer for producing at the output port of the FIFO buffer the selected pixel data sequentially stored in the FIFO buffer; and
 means coupled to the output port of the FIFO buffer for providing a display representation of the pixel data produced at the output port of said FIFO buffer.

2. Apparatus as in claim 1 wherein the memory includes a video random access memory (RAM) and:
 said means coupled to the input port includes the Video RAM for supplying blocks of pixel data to said FIFO buffer during successive clock intervals;
 said means coupled to the output port of the FIFO buffer includes data conversion means for providing deflection signals to a raster-type display;
 said first control means supplies said write control signals relative to said successive clock intervals to control storage in the FIFO buffer of selected blocks of pixel data in sequence; and
 said second control means supplies said read control signals to said FIFO buffer for a number N successive clock intervals to produce at said output port a block of pixel data during N clock intervals in a succession of blocks of pixel data at said output port.

3. Apparatus as in claim 2 further comprising:
 controller means coupled to said video RAM and to said first and second controller means for controlling the addressable locations in video RAM from which blocks of pixel data associated with a displayable line of a raster-type display are supplied to the input port of the FIFO buffer a number N times in relation to said number N clock intervals that read control signals are supplied to said FIFO buffer.

4. A method for controlling the display of successive blocks of pixel data, the pixel data being stored at addressable locations in memory, the method comprising the steps of:
 selectively and sequentially storing the successive blocks of pixel data at addressable locations in intermediate memory during recurring clock intervals in each of which pixel data is stored or inhibited from storage at addressable locations in intermediate memory;
 selectively and sequentially accessing from intermediate memory the successive blocks of pixel data during subsequent recurring clock intervals in each of which the sequentially-stored blocks of pixel data are accessed a number N times prior to accessing a subsequent block of pixel data a number N times; and
 displaying a representation of the selectively accessed pixel data.

* * * * *